March 25, 1958
B. W. BRUCKMANN
2,827,759
GAS TURBINE AIRCRAFT POWER PLANT HAVING
A CONTRAFLOW AIR-FUEL COMBUSTION SYSTEM
Filed Jan. 18, 1950
3 Sheets-Sheet 1
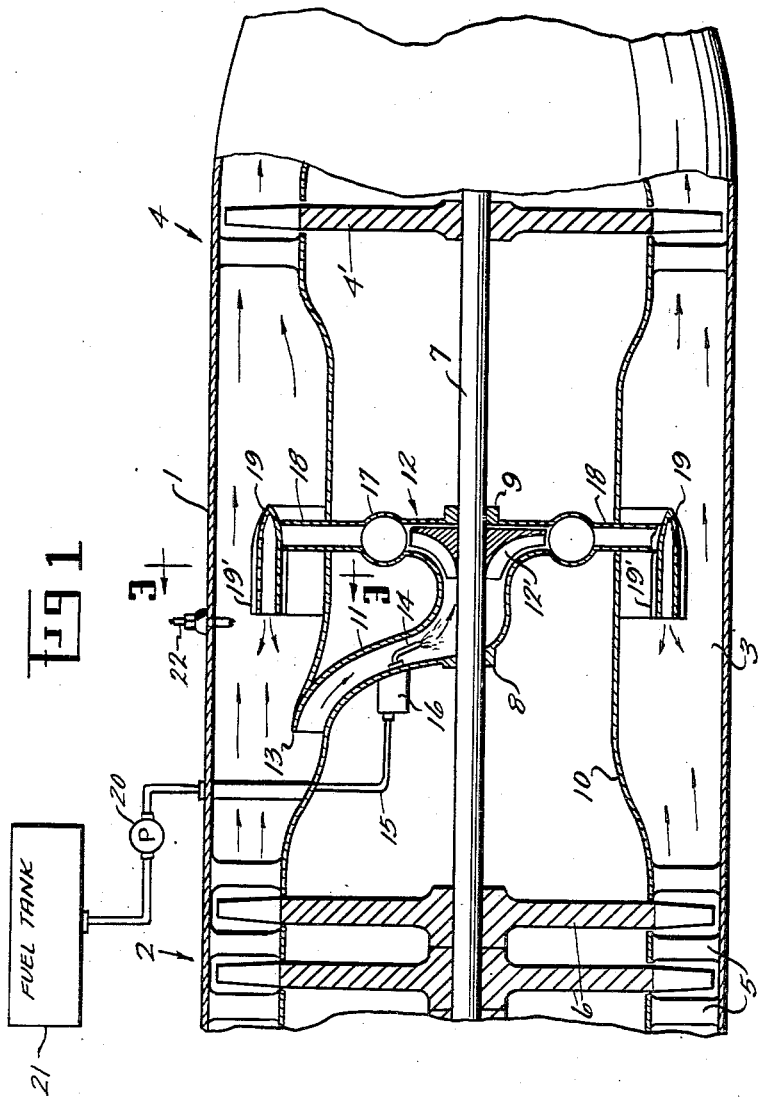
INVENTOR.
BRUNO W. BRUCKMANN
BY Wade Koontz
ATTORNEY
Charles L. Burgoyne
AGENT

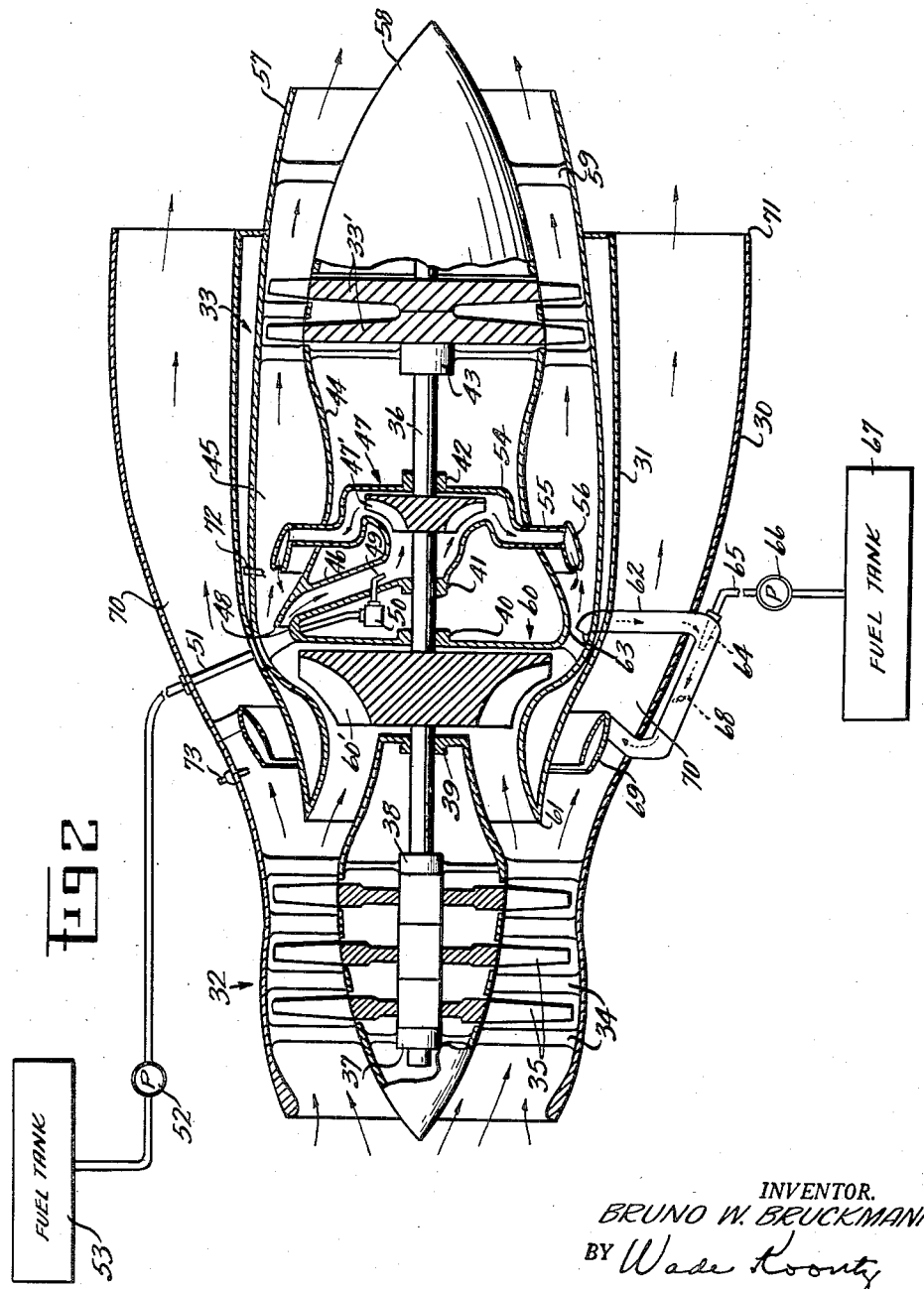

March 25, 1958   B. W. BRUCKMANN   2,827,759
GAS TURBINE AIRCRAFT POWER PLANT HAVING
A CONTRAFLOW AIR-FUEL COMBUSTION SYSTEM
Filed Jan. 18, 1950   3 Sheets-Sheet 3
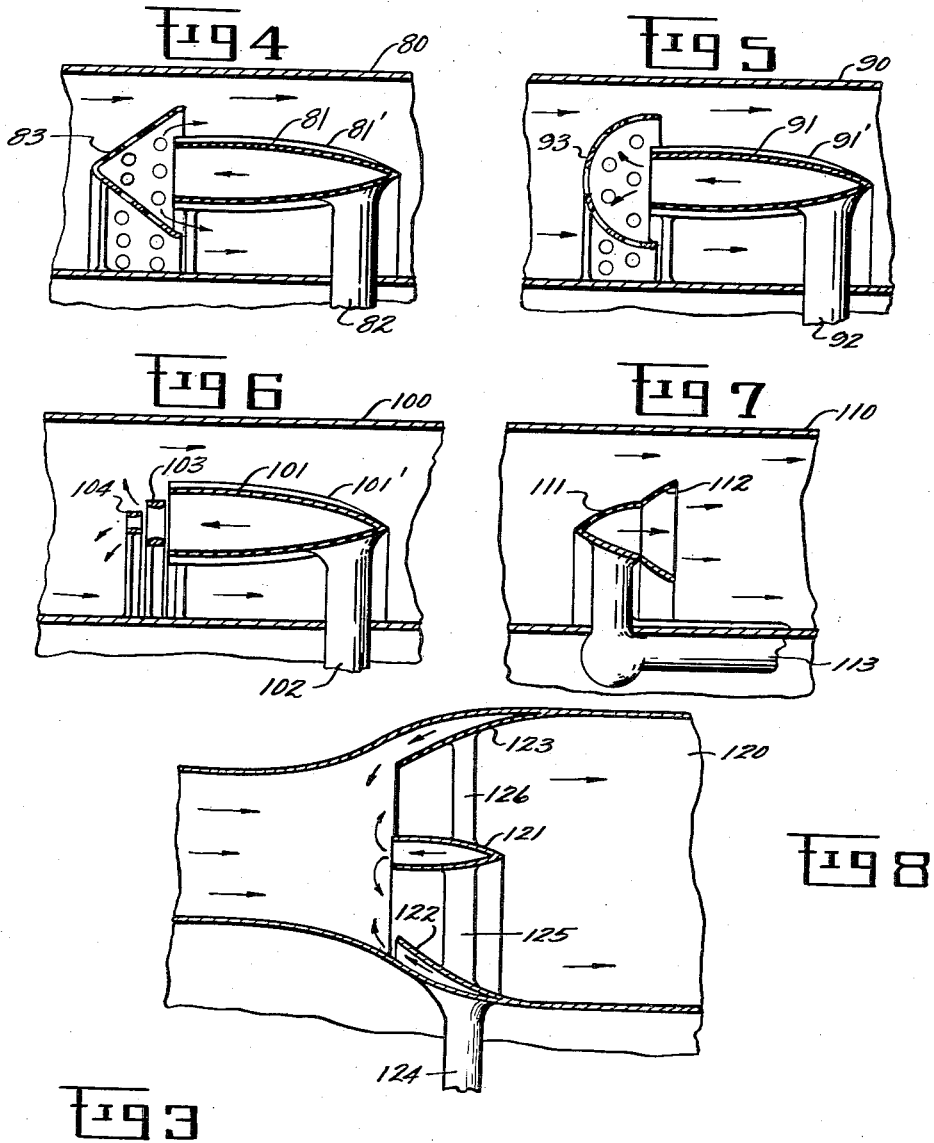
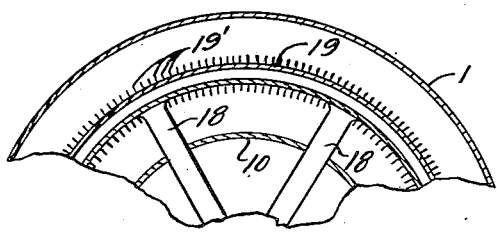
INVENTOR.
BRUNO W. BRUCKMANN
BY Wade Koontz
ATTORNEY
Charles L. Burgoyne.
AGENT United States Patent Office 2,827,759
Patented Mar. 25, 1958

2,827,759

GAS TURBINE AIRCRAFT POWER PLANT HAVING A CONTRAFLOW AIR-FUEL COMBUSTION SYSTEM

Bruno W. Bruckmann, Dayton, Ohio, assignor to the United States of America as represented by the Secretary of the Air Force Application January 18, 1950, Serial No. 139,200

4 Claims. (Cl. 60—35.6)

(Granted under Title 35, U. S. Code (1952), sec. 266)

The invention described herein may be manufactured by or for the United States Government for governmental purposes without payment to me of any royalty thereon.

The present invention relates to a gas turbine aircraft power plant having a contraflow air-fuel combustion system.

The primary object of the invention is to provide a gas turbine power plant including a combustion chamber and fuel system wherein a liquid fuel is discharged in a fine spray into an air-fuel manifold where the fuel is thoroughly mixed with air before being discharged into the combustion chamber of the power plant.

A further object of the invention is to provide a gas turbine power plant including a combustion chamber and fuel system wherein a suitable liquid fuel is atomized in a steady stream of secondary compressed air to provide a steady flow of a rich air-fuel mixture which is passed through a single-stage compressor before flowing to a discharge nozzle in the engine combustion chamber for discharge in a contraflow direction with respect to the primary compressed air flowing into and through the combustion chamber.

Another object of the invention is to provide a gas turbine power plant including an annular combustion chamber extending from an axial flow air compressor to an axial flow gas turbine and wherein the fuel system of the power plant includes an air-fuel manifold receiving a steady flow of secondary compressed air and a steady flow of atomized liquid fuel to provide a combined air-fuel mixture which flows through a single stage compressor before flowing into the annular combustion chamber by way of an annular nozzle or burner open only at the forward end thereof so as to discharge the air-fuel mixture in a contraflow direction with respect to the primary compressed air in order to obtain pronounced turbulence and improved combustion of fuel in the combustion chamber.

Another object of the invention is to provide a gas turbine power plant including an annular combustion chamber extending from an air compressor to a gas turbine and having mounted therein an annular fuel burner discharging an air-fuel mixture in a contraflow direction with respect to the compressed air flowing into said combustion chamber and further including a second annular combustion chamber around the first chamber extending from the air compressor to the open rearward end of the chamber and having mounted therein a second annular fuel burner discharging an air-fuel mixture in a contraflow direction with respect to the compressed air flowing into said second combustion chamber.

Another object of the invention is to provide a gas turbine power plant including an annular combustion chamber having an annular nozzle structure therein for discharging an air-fuel mixture into the combustion chamber in such a manner as to achieve complete combustion of the fuel by providing sufficient turbulence without the addition of auxiliary swirl vanes, flame holders or mechanical mixing devices.

Another object of the invention is to provide an improved air-fuel supply and mixing system particularly adapted for use in gas turbine power plants operating on liquid fuels.

The above and other objects of the invention will become apparent upon reading the following detailed description in conjunction with the accompanying drawings, in which:

Fig. 1 is a partial longitudinal cross sectional view of a turbojet aircraft engine including one possible arrangement of the present contraflow air-fuel combustion system.

Fig. 2 is a longitudinal cross sectional view of a turbojet aircraft engine including an auxiliary thrust augmenting cycle and showing a second possible arrangement of the present contraflow air-fuel combustion system.

Fig. 3 is a partial transverse cross sectional view taken on line 3—3 of Fig. 1.

Figs. 4 to 8 inclusive are partial longitudinal cross sectional views through the combustion chamber to show five possible modifications thereof.

In present day gas turbines and turbojet aircraft engines the combustion chamber or chambers are supplied with large volumes of compressed air and according to the usual or average practice raw unheated liquid fuel, such as kerosene, is sprayed under high pressure into the chambers to afford combustion with the development of heat. Thus the current practice as now understood is not unlike the combustion system of an oil-burning furnace, in which oil is forced from an atomizing nozzle into the combustion space where it burns in the presence of constantly flowing fresh air. This system may possess advantages such as simplicity, but for aircraft engines it is not economical nor even entirely reliable under changing conditions of air temperature, altitude and power requirements. Accordingly the present invention seeks to provide a combustion system for jet engines incorporating departures from current combustion practices. The principles involved in the proposed system may best be understood by reference to several preferred embodiments of the system, the first of which is illustrated in Fig. 1 of the drawings.

ENGINE OF FIGURE 1

In Fig. 1 there is shown a turbojet aircraft engine including a cylindrical sheet metal casing or pod 1 enclosing in fore-and-aft order air axial-flow multi-stage air compressor 2, an annular combustion chamber 3, and a single stage turbine 4. The entire compressor is not illustrated since the forward part is omitted to save space on the sheet but the compressor will usually include seven or more stages, each comprising guide vanes 5 and a vane equipped rotor 6. The rotors 6 are mounted rigidly on a central main shaft 7 also serving to carry the rotor 4' of the turbine 4; thus it will be clear that the turbine develops power to drive the compressor. The main shaft 7 is suitably journaled within casing 1 by means of longitudinally spaced bearings, such as those indicated at 8 and 9.

Mounted within the casing 1 in concentric relation is an inner casing 10 to provide the inside wall of the annular combustion chamber 3 and also to enclose the fuel injection manifold 11 and radial-flow air-fuel compressor 12. The manifold 11 is connected at one end 13 to the combustion chamber 3 close to the air inlet end thereof, so as to divert an appreciable part of the total volume of compressed air for mixing with the engine fuel before combustion. Since the intake end 13 of manifold 11 faces toward the outlet end of compressor 2, compressed air flows directly into the manifold without picking up any of the products of combustion which fill the rearward half of the combustion chamber 3. This compressed air flowing into the manifold 11 is heated to some extent by the compression process and also by contact with the heated metal walls of the manifold. Extending into the fuel injection manifold is a fuel injection nozzle 14 adapted to atomize the liquid fuel pumped thereto by way of the single fuel line 15. At 16 is a valve device interposed in the fuel line 15 between the nozzle 14 and the fuel pump 20. The fuel injection and atomizing nozzle is extended centrally of the manifold 11 and is adapted to direct the fuel spray downstream with respect to the secondary air flow diverted from the compressed air flowing from the compressor 2.

The fuel injection manifold 11 merges with the outer wall or casing of the radial-flow air-fuel compressor 12, which includes an impeller 12' rigidly secured to the main shaft 7 for rotation therewith. The mixture of secondary compressed air and atomized fuel is given a pressure boost by the compressor 12 and is further mixed in a more intimate manner whereby the fuel is partially vaporized, that is brought to a state of molecular dispersion in the compressed air. From the outlet manifold 17 the air-fuel mixture passes through a series of radially extending conduits 18 into an annular nozzle structure 19 open at the forward end to cause the air-fuel mixture to flow from the nozzle or burner 19 in a contraflow direction with respect to the incoming primary compressed air delivered from the air compressor 2. The thoroughly mixed air-fuel dispersion is heated to some extent by compression in the radial-flow compressor 12 and in passing through the annular nozzle 19 is further heated. The nozzle or burner 19 carries longitudinal fins 19' extending into the stream of burning fuel and gases so as to conduct heat from the products of combustion to the walls of the nozzle structure. This feature is best shown in Fig. 3 of the drawings. As the air-fuel mixture issues from the nozzle 19 it meets the oppositely flowing primary compressed air and the turbulence resulting from the collision of these fluid streams causes thorough mixing of the fuel and air at the same time incoming fuel is constantly being ignited by the continuous combustion process. The well mixed fuel and air is carried rearwardly by the large volumes of primary air and combustion proceeds around and to the rear of the nozzle structure 19, with the evolution of heat and the increase of volume caused thereby. The heated gases now flow through the turbine 4, thereby delivering power to drive the main shaft 7 and the compressors 2 and 12. The heated gases give up some of their kinetic energy to the turbine and then flow rearwardly therefrom into the exhaust nozzle or exhaust jet of the engine which is open to the atmosphere. As will be understood by those skilled in the gas turbine art, the engine if used on aircraft will be mounted with the compressor toward the front end of the aircraft and the exhaust nozzle toward the rear end of the aircraft.

Certain auxiliary components are required as with any complete power plant of the kind under consideration. For instance the fuel flowing in the single fuel line must be maintained under pressure to obtain a good atomizing effect at the atomizer or fuel jet 14. Thus a fuel pump 20 is provided in the fuel line 15 and also a fuel tank 21 is indicated diagrammatically to supply a suitable hydrocarbon fuel to the engine fuel system. In order to start combustion of fuel in the combustion chamber 3, one or more igniters or spark plugs 22 are provided. These are usually electrically fired only until the engine is started and partly warmed up. After that the combustion process maintains itself in operation just like an oil-burning furnace, as long as fuel and air are supplied at more or less steady rates and in sufficient volumes.

The operation of the engine and fuel supply system is fairly obvious from the above description. The air-fuel mixture with the fuel at least partly vaporized issues from the annular burner 19 at fairly high velocity but since it meets the incoming primary compressed air, the air-fuel charge has its direction of flow reversed immediately and at the same time the fuel begins to burn. This reversal of flow direction provides a turbulent mixing of air and fuel and helps to promote complete combustion of the fuel in a minimum of time. The more efficient mixing of air and fuel and the improved combustion characteristics make possible an engine with greater fuel flow capacity and also makes possible the use of an annular combustion chamber, which is potentially capable of higher rates of heat release due to the larger frontal area for a given outside diameter. The removal of the fuel atomizer from the combustion chamber prevents fouling up of the jets due to carbon formation, and the use of only a single atomizer reduces the piping and control difficulties inherent in the multiple fuel nozzle combustion systems commonly in use at the present time. The single fuel atomizer 14 having a controllable orifice thereby makes the atomizing characteristics independent of the rate of fuel flow.

ENGINE OF FIGURE 2

In Fig. 2 there is shown a second and more complicated turbojet aircraft engine including an outer sheet metal casing or housing 30 enclosing an inner double-walled casing 31. At the forward end of the casing 30 is an axial-flow multi-stage air compressor 32 and near the rearward end of the inner casing 31 is a two-stage axial-flow gas turbine 33. Each stage of the compressor 32 includes a row of stationary guide vanes 34 and a vane equipped rotor 35. The rotors are mounted rigidly on a central main shaft 36 which also serves to carry the rotors 33' of the turbine 33. The main shaft 36 is suitably journaled within the casing 30 by means of longitudinally spaced bearings such as those indicated at 37 to 43 inclusive.

Mounted within the inner casing 31 is a third casing 44 to provide the inside wall of an annular combustion chamber 45 and also to enclose the fuel injection manifold 46 and the radial-flow air-fuel compressor 47. The manifold 46 is open at one end 48 to the combustion chamber 45 close to the air inlet end thereof, so as to divert an appreciable part of the total volume of compressed air to provide a secondary air flow for mixing with finely divided engine fuel before combustion of the fuel in the chamber 45. The intake end 48 of the fuel injection manifold 46 faces directly into the air outlet end of the air compressor, so that secondary compressed air diverted into the manifold is not mixed with products of combustion formed farther aft in the combustion chamber. Extending into the fuel injection manifold 46 centrally thereof is a fuel injection nozzle or atomizer 49, adapted to spray liquid fuel in a downstream direction with respect to the secondary air flowing in the manifold 46 toward the air-fuel compressor or booster 47. At 50 is a valve device interposed in the fuel line 51 as shown. Fuel is supplied to the valve 50 by way of a fuel line 51 extending outside the engine housing to a fuel pump 52 and a fuel tank 53.

The fuel injection manifold 46 merges with the outer wall or casing of the radial-flow air-fuel compressor 47, which includes an impeller 47' rigidly secured to the main shaft 36 for rotation therewith. The mixture of secondary compressed air and atomized fuel is given a pressure boost by the compressor 47 and is further mixed in a more intimate manner, whereby the fuel becomes at least partially vaporized and thoroughly dispersed in the secondary air. From the compressor manifold 54 the air-fuel mixture passes through a series of radially extending conduits 55 into the annular nozzle structure 56 open at the forward end to allow the fuel charge to flow in a contraflow direction with respect to the incoming primary compressed air. The fuel and air are warmed up considerably in passing through the conduits 55 and nozzle structure 56 and upon issuing from the nozzle or burner 56 are ignited for combustion of the fuel around the burner and also rearwardly thereof. Since the issuing air-fuel charge meets the incoming primary air flow head-on, the fuel and air becomes thoroughly mixed by the turbulence around the annular outlet of burner 56. The burning fuel creates a high temperature in the combustion chamber and the resulting rapid expansion of the flowing gases provides a driving effect on the two-stage turbine 33 as well as providing a steady flow of rapidly expanding gas for flow from the exhaust nozzle 57. A rearward continuation of the inside casing 44 provides a tail cone 58 filling the central portion of the exhaust nozzle 57 to promote smooth non-turbulent flow of exhaust gases from the engine. The cone 58 may be suitably supported by struts 59 extending outwardly to the double-walled inner casing 31. The compressed air flowing into the combustion chamber 45 is not only compressed by action of the main axial-flow compressor 32 but is further compressed by passage through the radial-flow compressor 60, which includes an impeller 60' rotating with the main shaft 36.

The compressed air from the main air compressor 32 divides into two annular streams by reason of the annular flow dividing formation 61 at the forward end of the double-walled inner casing 31. The inside path through auxiliary air compressor 60, combustion chamber 45 and turbine 33 has been described sufficiently above, but the outside path starting at the annular space between casing formation 61 and outer casing 30 will now be described.

It is noted that an air diversion manifold 62 is provided having an open end portion 63 to pick up secondary compressed air from the outlet of the auxiliary air compressor 60. Extending into the manifold in a downstream direction is a fuel injector or atomizer 64 connected to a fuel line 65 which is fed by a fuel pump 66 and fuel tank 67. A butterfly damper valve 68 in the manifold 62 may be preset to regulate the volume of secondary air diverted from the air compression system, and the valve 68 may be turned off completely when it is desired to stop fuel flow to atomizer 64 and shut off combustion in the engine cycle presently under consideration. The fuel and air mixture flows to the annular burner 69 for distribution in a contraflow relation with respect to the primary air flow. It is to be understood that more than one air-fuel manifold 62 will usually be provided to give more even fuel distribution to the annular fuel burner or nozzle 69 but because of limitations of the sectional view only one such manifold is shown in Fig. 2. The combustion of fuel proceeds around the annular nozzle 69 and rearwardly thereof and the resulting expansion of gas in the annular combustion chamber 70 results in a forward thrust on the engine. Of course the rearward end of the combustion chamber is open to the atmosphere to provide a free-flow annular nozzle 71 concentric with respect to the inner exhaust nozzle 57. The engine cycle involving the air flow through the outer annular combustion chamber 70 may or may not include burning of fuel, since the engine will be completely operative with combustion occurring only in the inner combustion chamber 45. However the additional outer combustion chamber if supplied with an air-fuel mixture under proper conditions will serve to increase the engine thrust very markedly, acting something like an afterburner in the exhaust duct of a conventional turbojet engine. Because of the systematic preparation of the fuel charge before combustion, the combustion process in the outer chamber 70 will be more economical of fuel than would be the case if an ordinary afterburner or coburning chamber were employed. The inner and outer combustion chambers 45 and 70 are provided with igniters 72 and 73 respectively in order to start the combustion process in the chambers.

When the engine is used on an aircraft it will always be mounted with the air compressor end toward the forward end of the aircraft and with the engine extending in fore-and-aft relation with respect to the aircraft. If the engine is mounted within a fuselage, suitable ducts may be provided to bring fresh air to the compressor and to conduct exhaust gases from the rearward end of the fuselage into the atmosphere.

*Modifications of the air-fuel nozzle*

From the above description of two embodiments of the invention, the principles thereof should be fairly clear. However, certain refinements in the construction and arrangement of the air-fuel nozzle within the annular combustion chambers may be desirable to achieve the best results, particularly to give more uniform heat distribution and to prevent flame blow out under the impact of the flowing primary compressed air. Consideration of Figs. 4 to 8 inclusive will now be given to show five possible modifications of the air-fuel nozzle or burner structure.

In Fig. 4 the annular combustion chamber 80 has mounted therein in concentric relation an annular nozzle 81 supplied with an air-fuel mixture by way of one or more conduits 82. The nozzle 81 carries longitudinal heat collecting fins 81' to assist in transfer of heat of combustion to the incoming air-fuel mixture. Around the forward end of the nozzle 81 is a perforated annular distribution ring 83 adapted to more evenly diffuse and distribute the air-fuel mixture with respect to the incoming primary air moving from left to right. The ring 83 also provides means to decrease the impact of incoming primary air on the open end of the air-fuel discharge nozzle 81. This will make it possible in some cases to simplify the auxiliary compressor or even omit such compressor entirely. Because of ignition lag the fuel will not start to burn until its direction has been reversed and it has started to flow in the same direction as the primary air supply. Before starting to burn the fuel becomes thoroughly mixed with the air supply and complete combustion proceeds immediately. The distribution ring or diffuser is in the form of a hollow ring of triangular cross sectional form with the two forward walls provided with perforations, so that the air-fuel mixture issuing from the nozzle 81 will tend to fan out both inwardly and outwardly to about the same extent.

In Fig. 5 the annular combustion chamber 90 has mounted therein in concentric relation an annular air-fuel nozzle 91 supplied with an air-fuel flow by way of conduit 92. The nozzle 91 carries the heat transfer fins 91' for reasons already explained. Around the forward or outlet end of the nozzle 91 is a perforated annular distribution ring 93 to assist in distributing the fuel more evenly and also to partially deflect primary air away from the outlet end of nozzle 91 as described with reference to Fig. 4 above. The ring 93 is of hollow sheet metal construction having its semi-circular forward side perforated to allow ready escape of the air-fuel mixture into the combustion chamber.

In Fig. 6 the annular combustion chamber 100 has mounted therein in concentric relation an annular air-fuel nozzle 101 having flanges or fins 101' thereon and supplied with an air-fuel mixture by means of a conduit 102. Forwardly of the outlet end of nozzle 101 there are provided concentric diffuser passages formed by pairs of rings 103 and 104 which have rounded or flared confronting surfaces to provide smoother flow of the air-fuel mixture and to assist in diffusing the charge into the primary air flow. These rings are supported from the inside surface of the combustion chamber by suitable thin struts. As in Figs. 4 and 5 the fuel diffuser in front of the nozzle tends to cause the fuel to be carried farther forwardly and outwardly also for better mixing of fuel and air in a more systematic manner. The turbulent flow forwardly of the nozzle is thus made to spread out more evenly across the combustion chamber space.

In Fig. 7 the nozzle structure 111 mounted in the combustion chamber 110 is of generally annular form as before but the flared outlet end 112 thereof opens toward the rear of the combustion chamber to diffuse the air-fuel mixture in the same flow direction as the primary compressed air. The results obtained are comparable to those obtained with the other forms of air-fuel nozzle because the flared outlet of the nozzle tends to promote turbulence in the combustion space. The use of a nozzle opening rearwardly as shown will make possible elimination of an additional pressure boost and elimination of the auxiliary compressor but will tend to make the combustion occur farther back in the combustion chamber. The fact that the secondary air and fuel are already thoroughly mixed in proportions which could be burned almost without primary air, will mean that the preheated rich air-fuel mixture will burn more rapidly as it mixes with the primary air flow.

In Fig. 8 the annular combustion chamber 120 has mounted therein in concentric relation an annular air-fuel nozzle 121 opening toward the forward end of the combustion chamber, so as to cause the air-fuel mixture to flow from the nozzle in a contraflow direction with respect to the primary air. To achieve improved fuel distribution the inside and outside walls of the combustion chamber are provided with annular air-fuel nozzles formed by flanges 122 and 123 attached to the walls and flaring away from the associated walls. By means of a series of interconnected conduits 124, 125 and 126 the air-fuel mixture from the air-fuel manifold is carried to the various nozzles for flow therefrom against the current of primary compressed air. The use of three annular concentric air-fuel nozzles, as shown in Fig. 8, provides excellent fuel distribution throughout the combustion chamber without the diffusion devices of Figs. 4, 5 and 6. The proportioning of the cross sectional area of the air-fuel nozzles 121 and 123 provides a means to influence the temperature distribution across the combustion chamber at will. It is noted that in the contraflow fuel injection system stressed in the present description, the moderately rich air-fuel mixture issues from the nozzle at fairly high velocity but immediately upon issuance therefrom the large volume of high pressure primary air stops flow of the air-fuel mixture in the forward direction and carries the charge along in the rearward direction with the predominant current of primary air. Thus immediately in front of the air-fuel nozzle there is a zone of stagnation in which the fuel may readily become ignited as it begins to mix with the primary air.

SUMMARY

The first described form of aircraft power plant shows the possibilities of the present air-fuel combustion system in a turbojet engine including an annular combustion chamber and clearly illustrates the relative simplicity of the fuel injection system. It also shows the arrangement for mixing fuel and secondary air and boosting the pressure of the charge for causing the mixture to flow from a diffusing and distributing nozzle in a contraflow direction with respect to the primary air flow.

The second described form of aircraft power plant shows the use of the present air-fuel system in a turbojet engine of the dual cycle type wherein one cycle is a compressor-combustion turbine cycle and the other is a compressor-combustion chamber cycle providing what may be called a coburning chamber. The coburning chamber is used only intermittently to give a high thrust force. With the present fuel system the consumption of fuel in the outer coburning chamber and the pressure losses when no fuel is supplied for combustion are reduced to a minimum. Also with the arrangement shown the air-fuel mixture for the coburning chamber is obtained without the addition of a separate air-fuel compressor or pressure booster.

The principal advantages of the air-fuel combustion system as outlined herein may be enumerated as follows:

(1) The contraflow principle causes turbulent mixing of air and fuel without mechanical accessories in the combustion chamber where heat is a destructive influence on metals.

(2) Improved fuel preparation and preheating of air-fuel mixture results in improved combustion efficiency and increased flame velocity.

(3) Improved fuel preparation promotes complete combustion in a shorter time and makes possible a reduction in the length of the combustion chamber.

(4) Controllability of the fuel flow by means of a single adjustable fuel atomizer working at comparatively low pressure thus avoids multiplicity of atomizers, complicated piping and difficulties of high pressure fuel supply system and particularly makes atomizing characteristics independent of rates of fuel flow through the atomizer.

(5) Better atomizing characteristics over all fuel flow ranges gives better performance and better controllability and therefore reduces the danger of blow out or rough operation at high altitudes.

(6) Possibilities for more extended use of annular combustion chambers in gas turbines, which are inherently more favorable for use on aircraft.

(7) Improvement in combustion efficiency results in better fuel economy and longer range in jet propelled aircraft.

The embodiments of the invention herein shown and described are to be regarded as illustrative only and it is to be understood that the invention is susceptible of variations, modifications and changes within the scope of the appended claims.

I claim:

1. A turbojet aircraft engine, comprising, a main air compressor at the inlet end of said engine, an annular combustion chamber receiving compressed air from said main air compressor, a gas turbine located at the outlet end of said combustion chamber and including a central drive shaft extending into driving engagement with said main air compressor, means for diverting a relatively minor portion of said compressed air towards said central drive shaft consisting of a fuel injection manifold positioned adjacent the inlet end of said combustion chamber, means for injecting atomized fuel into said diverted minor portion of compressed air flowing through said fuel injection manifold, means in communication with said fuel injection manifold remote from said inlet end of said combustion chamber arranged intermediate said fuel injection manifold and said combustion chamber including an auxiliary radial flow air compressor driven directly by said turbine for boosting the pressure of said diverted air and fuel mixture and for thoroughly mixing the air and fuel, means for directing said air-fuel mixture into said combustion chamber in a contraflow direction to the direction of the major portion of said compressed air flowing into said combustion chamber from the inlet end thereof, said last named means comprising a main annular fuel burner radially tapered toward the rear end of said aircraft engine and concentrically located within said combustion chamber and including an annular air-fuel escape nozzle directed forwardly in said combustion chamber to deliver air-fuel mixture directly against the oncoming compressed air and conduit means between said fuel injection manifold and said fuel burner delivering said air-fuel mixture to said fuel burner, and means providing a gas exhaust jet leading from the outlet side of said turbine to free atmosphere.

2. A turbojet aircraft engine as in claim 1, and means assisting said main annular fuel burner in evenly distributing and directing said air-fuel mixture in a contraflow direction, comprising, a pair of additional fuel burner nozzles incorporated on the inside walls of said combustion chamber and a plurality of interconnected conduits directing said air-fuel mixture from said air-fuel radial flow compressor to said nozzles.

3. A turbojet aircraft engine, comprising, an intermediate double-walled casing, an outer sheet metal casing housing said intermediate casing, an axial-flow main air compressor positioned at the inlet end of said outer casing, an axial-flow gas turbine positioned at the outlet end of said outer casing, a main central drive shaft between said turbine and said main air compressor and journaled within said outer casing, an inner casing mounted within said intermediate casing, an annular combustion chamber between said inner and intermediate casings, a fuel injection manifold and a radial-flow air-fuel compressor housed in said inner casing, said fuel injection manifold open at its outer end to said combustion chamber adjacent to and facing the air inlet of said combustion chamber to divert a relatively minor secondary portion of compressed air delivered to said combustion chamber by said axial-flow air compressor and at its inner end leading into and merging with a wall of said air-fuel compressor, a fuel injection nozzle injecting and mixing atomized fuel in said manifold in a downstream direction relative to said secondary flow of compressed air, said radial-flow air-fuel compressor including an impeller boosting the pressure of and further mixing and dispersing the fuel in the air of said air-fuel mixture flowing into said air-fuel compressor through said manifold, an annular fuel-burner nozzle mounted in said combustion chamber and open towards the air inlet thereof, and a plurality of radially extending conduits between said air-fuel compressor and said nozzle delivering air-fuel mixture in a direction opposite to and in direct contact with the incoming primary compressed air by way of said nozzle.

4. A turbojet aircraft engine as in claim 3, and means controlling the distribution of temperature in said combustion chamber, comprising, a pair of flanges attached to the inside wall surface of said combustion chamber and flared outwardly therefrom toward the air inlet of said combustion chamber to form a pair of additional fuel burner nozzles of predetermined cross sectional area relative to said first-named fuel burner nozzle, and interconnected conduit means between said air-fuel compressor and said last-named fuel burner nozzles delivering additional air-fuel mixture to said additional pair of nozzles in a contraflow direction to said primary flow of compressed air.

References Cited in the file of this patent

UNITED STATES PATENTS

| | | |
|---|---|---|
| 1,542,294 | Fogler | June 16, 1925 |
| 2,404,335 | Whittle | July 16, 1946 |
| 2,482,505 | Pierce | Sept. 20, 1949 |
| 2,489,683 | Stalker | Nov. 29, 1949 |
| 2,503,006 | Stalker | Apr. 4, 1950 |
| 2,595,505 | Bachle | May 6, 1952 |

FOREIGN PATENTS

| | | |
|---|---|---|
| 577,017 | Great Britain | of 1942 |
| 627,644 | Great Britain | Aug. 12, 1949 |
| 935,322 | France | Feb. 2, 1948 |